United States Patent [19]
Onosaka

[11] Patent Number: 5,500,893
[45] Date of Patent: Mar. 19, 1996

[54] TELEPHONE APPARATUS, INFORMATION PROCESSING APPARATUS AND INFORMATION COMMUNICATION TERMINAL

[75] Inventor: Kazunobu Onosaka, Tokyo, Japan

[73] Assignee: Sony Corporation, Tokyo, Japan

[21] Appl. No.: 302,406

[22] Filed: Sep. 8, 1994

[30] Foreign Application Priority Data

Sep. 14, 1993 [JP] Japan ..................................... 5-252303

[51] Int. Cl.$^6$ ................................................. H04M 11/00
[52] U.S. Cl. ................................ 379/396; 379/93; 379/96
[58] Field of Search ................................ 379/396, 90, 93, 379/98, 96, 97

[56] References Cited

U.S. PATENT DOCUMENTS

| | | | |
|---|---|---|---|
| 5,146,488 | 9/1992 | Okada et al. | 379/100 |
| 5,193,176 | 3/1993 | Brandin | 395/575 |
| 5,299,255 | 3/1994 | Iwaki et al. | 379/96 |
| 5,369,700 | 11/1994 | Koura et al. | 379/95 |

*Primary Examiner*—Jeffery Hofsass
*Assistant Examiner*—Jacques M. Saint-Surin
*Attorney, Agent, or Firm*—William S. Frommer

[57] ABSTRACT

An information communication terminal having a telephone and an informational processing device for communicating with other such terminals or communication devices by way of a telephone network. The informational processing device is adapted to execute a number of predetermined application programs and perform data communication which includes receiving electronic mail by way of the telephone network. The informational processing device may include a battery, a device for generating a battery informational signal representing a charged state of the battery, a first display device for displaying thereon results of the execution of an application program and information corresponding to the electronic mail, a device for generating an electronic mail informational signal representing the receipt of electronic mail, and a device for generating a disconnect command signal when the informational processing device is performing data communication. The telephone is adapted for communicating between operators by way of the telephone network. The telephone may include a second display device for displaying indications corresponding to the battery and electronic mail informational signals so as to provide indications of the charged state of the battery and of the received electronic mail to the operator of the telephone. The telephone may further include a device for disconnecting the telephone from the telephone network when the informational processing device is performing data communication by way of the telephone network.

12 Claims, 9 Drawing Sheets

TELEPHONE APPARATUS, INFORMATION PROCESSING APPARATUS AND INFORMATION COMMUNICATION TERMINAL

BACKGROUND OF THE INVENTION

This invention relates to an information processing apparatus, a telephone apparatus and an information communication terminal. More particularly, it relates to an information processing apparatus for communication over a telephone network to which is connected the telephone apparatus, a telephone apparatus, and an information communication terminal.

If, with the information processing apparatus, such as the so-called electronic memorandum notebook, portable computer or a small-sized computer, data communication, such as electronic mailing, is to be performed over the telephone network to which is connected the telephone handset, a modem unit is connected to the telephone network, and data communication is performed via the modem unit.

If, during such data communication, the user inadvertently phones, that is dials with the handset in the off-hook state, such operation represents a noise to the data communication, such that data communication results in failure. That is, the user desiring to phone with the conventional information processing apparatus is unaware that data communication is proceeding on the same telephone network, so that he or she phones through mistake despite the fact that data communication is going on.

On the other hand, whether data such as electronic mail is being received by data communication, or whether there is any unread electronic mail, is confirmed by running an electronic mail software and by consulting the display on the display screen. That is, with the conventional information processing apparatus, whether or not there is any un-read electronic mail cannot be known in the power save mode or sleep mode aimed at saving the power.

On the other hand, with the information processing apparatus, operated by a storage battery, the charged state of the battery can be confirmed by the user by running a software detecting the battery voltage and displaying the detected voltage, and by the user consulting the display on the display screen. That is, with the conventional information processing apparatus, it is necessary to turn on a power source switch in order to run the software, even although the battery is being charged with the power source switch being turned off.

SUMMARY OF THE INVENTION

In view of the above-depicted status of the art, it is an object of the present invention to provide an information processing apparatus, a telephone apparatus and an information communication terminal in which data communication may be allowed to proceed as normally even if the user inadvertently phones during data communication, and in which the charged state of the battery or the possible presence of the electronic mail can be confirmed with the power source of the information processing apparatus being turned off.

The present invention provides an information processing apparatus wherein the status of the information processing apparatus displayed on the display screen is outputted to outside as the status information.

The present invention also provides a telephone apparatus having a display device, wherein display based on the status information outputted by the information processing apparatus is made on the display device.

The present invention also provides an information terminal comprising the information processing apparatus and the display device.

With the above-described information processing apparatus of the present invention, the status information is outputted by a demand from outside.

With the above-described information processing apparatus of the present invention, there is also provided communication means for communication via a telephone network. In this case, the status information outputted to outside is the information indicating that communication by the communication means is going on.

With the above-described telephone apparatus, there is provided telephone network disconnecting means for disconnecting a telephone network. In such case, the telephone network is disconnected by the telephone network disconnecting means during communication by the information processing apparatus based on the output information of the information processing apparatus indicating that communication is going on.

With the above-described information processing apparatus of the present invention, there is also provided electronic mail receiving means. In such case, the status information outputted to outside is the information indicating whether or not there is any electronic mail received by the electronic mail receiving means.

With the above-described information processing apparatus of the present invention, there are also provided a storage battery as a power source, and charged state detection means for detecting the charged state of the storage battery. In such case, the status information outputted to outside is the information indicating the charged state of the storage battery as detected by the charged state detection means.

DETAILED DESCRIPTION OF THE PREFERRED EMBODIMENTS

Referring to the drawings, preferred embodiments of the information processing apparatus, telephone apparatus and the information communication terminal according to the present invention will be explained in detail.

Figure 1:
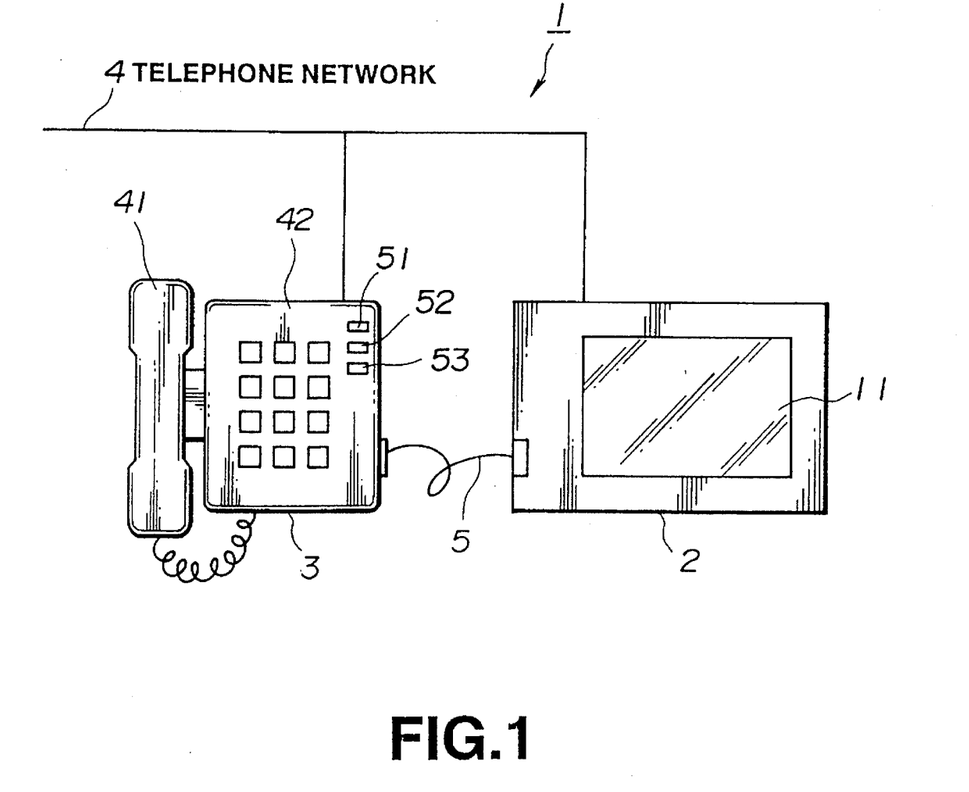
FIG.1 is a block diagram showing a specific arrangement of an information communication terminal according to the present invention.

An information communication terminal 1 according to the present invention is made up of an information processing apparatus 2, such as an electronic memorandum notebook, portable computer or a small-sized computer, and a telephone apparatus 3, as shown for example in FIG.1. With the telephone apparatus 3, when the user lifts a handset 41 so that the handset 41 is in the off-hook state and dials using a dial button 42 for establishing the channel, the user is at a position to talk with the called party, using the handset 41.

On the other hand, the information processing apparatus 2 executes a variety of application programs and displays the results of execution thereof on a display screen, formed by a liquid crystal display 11 (LCD), while taking charge of data communication, such as electronic mail, over a telephone network 4 having a so-called tip and ring, to which is connected the telephone apparatus 3.

The information processing apparatus 2 is also so designed and constructed that the information showing the state of the information processing apparatus displayed on the LCD 11, such as the information indicating the data communication going on, the information showing the possible presence of the newly received electronic mail or an unread electronic mail or the information showing the charged state of the storage battery, is outputted over a serial cable 5 to the telephone apparatus 3 for making corresponding display on the display unit by, for example, flickering light emitting diodes (LEDs) 51, 52 and 53. On the other hand, the telephone apparatus 3 disconnects the telephone network 4, when the information processing apparatus 2 is performing data communication, based upon the information indicating that data communication is going on.

Figure 2:
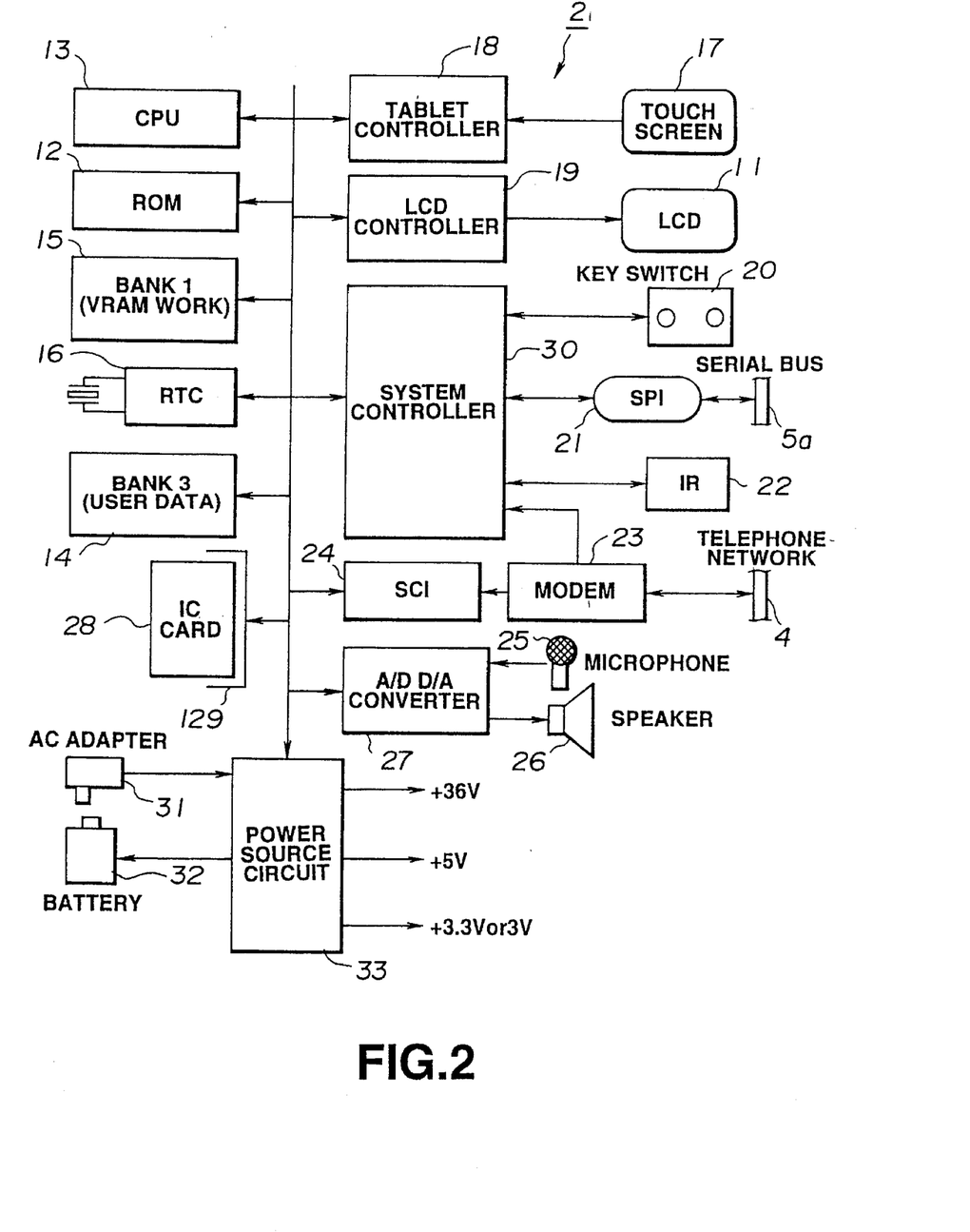
FIG.2 is a block diagram showing a specific arrangement of an information processing apparatus according to the present invention.

Referring now to FIG.2, the information processing apparatus 2 includes a read-only memory (ROM) 12 in which an operation program (OS) or a variety of application programs are stored, and a central processing unit (CPU) 13 for executing the programs stored in the ROM 12. The information processing apparatus also includes a random access memory (RAM) 14 for storing the data and a video RAM 15 for storing picture data displayed on the LCD 11, a real time clock 16 (RTC) for time supervision, a tablet 17 (touch-screen) for the user to enter the information, a tablet controller 18 for controlling the touch-screen, an LCD controller 19 for controlling the LCD 11 and a key switch 20 for the user to enter the information. The information processing apparatus also includes an SPI 21 for data transmission and reception with the telephone apparatus 3 over the serial cable 5, an IR interface 22 (IR) for data communication with external equipment with infrared rays, a modem unit 23 for data communication over the telephone network 4, an SCI 24 for taking charge of interfacing between the modem unit 23 and the CPU 13, a microphone 25 for entering the speech and a speaker 26 for outputting the speech. Finally, the information processing apparatus also includes a converter 27 made up of an A/D converter for converting speech signals from the microphone 25 into speech data and a D/A converter for converting speech data into speech signals, a function extension unit 29 connected to a so-called IC card 28 for transmitting/receiving programs or data, a system controller 30 for controlling the key switch 20, SPI 21, IR 22 and the modem unit 23, and a power source circuit 33 for supplying power to the various components from an AC adapter 31 or a battery 32.

The CPU 13 executes various application programs previously stored in the ROM 12, for example, a kana-kanji conversion program for word processing with a dictionary table therefor, a handwritten input character recognition program with a dictionary table therefor, or a program for remote control of a television receiver or the like, and displays the results of execution on the LCD 11. The CPU 13 also stores data required to be stored after turning off the power source, for example, data such as documents, schedules or addresses, or remote controlling data which the user selected and set by so-called training, in the RAM 14.

That is, the LCD controller 19 routes picture data read out from the video RAM 15 under control by the CPU 13, to the LCD 11. The LCD 11 has 512 horizontal electrodes and 342 vertical electrodes associated with 512×342 pixels, representing a pre-set resolution, and a driving circuit, not shown, for applying a pre-set voltage to these electrodes. The driving circuit sequentially applies a pre-set voltage to the 342 vertical electrodes, while also sequentially applying a pre-set voltage to the 512 horizontal electrodes based upon picture data supplied via the LCD controller 19. As a result, the pixels of the LCD 11 are scanned in order to display a picture on the LCD 11. The LCD 11 also has a phosphor plate for so-called backlight for radiating the light from the back side of the liquid crystal display screen, and an inverter circuit for converting the voltage supplied from the power source circuit 33 for supplying power to the phosphor plate.

On the other hand, the touch-screen 17 is a tablet of a transparent material arranged outside of the LCD 11. With the touch-screen 17, the picture displayed on the LCD 11 through the tablet may be viewed, at the same time as the position information on the screen of the LCD 11 may be entered using a dedicated pen, not shown.

That is, the tablet of the touch-screen 17 has 512 horizontal electrodes and 342 vertical electrodes corresponding to a pre-set resolution, herein the resolution of the LCD 11, and a clock generator, not shown, for applying a pre-set voltage to these electrodes. Under control by the tablet controller 18, the clock generator sequentially applies a pre-set voltage to the 512 horizontal electrodes and 342 vertical electrodes for scanning the tablet. The pen has a switch at its distal end, so that, when the pen is approached to the tablet, a pre-set capacitance is formed between the tablet and the pen. If the pen is thrust against the tablet, the switch on the distal end of the pen is turned on. The tablet controller 18 detects the point thrust by the pen by detecting electrical charges generated between the tablet electrode and the pen when the switch is turned on. The CPU 13 perpetually monitors the position at which the switch is turned on (pen-down position) and the position at which the pen is detached from the tablet and the switch is turned off (pen-up position) for accepting and establishing the input with the pen-down and pen-up, respectively.

The coordinate information for the characters or symbols, as entered by the user, is supplied to the CPU 13, which then recognizes the characters as entered by the user by execution of the character recognition program, or stores the documents or the like as entered by the user by execution of the kana-kanji conversion program. By being touched with the user's finger, for example, the touch-screen 17 is able to select one of plural selection information data displayed on the display screen.

In addition, the CPU 13 executes the remote-control program to read out remote controlling data stored in the RAM 14 to transmit the read-out data to the system controller 30, which then transmits the remote controlling data and transmission data over the IR interface 22 to the television receiver or the like for remote controlling these equipment.

On the other hand, the CPU 13 causes speech data to be supplied to or fetched from the converter 27. The CPU also causes the speech to be outputted by the speaker 26 and causes the speech collected by the microphone 25 to be fetched.

Meanwhile, the CPU 13 of the information processing apparatus 2 executes, in addition to the above-mentioned various application programs, a software for initializing the telephone apparatus 3, an electronic mail software for data communication over the telephone network 4 connected to the telephone apparatus 3, such as exchange of electronic mails, a mail display software for reading out and displaying the received electronic mail from the RAM 14, a software for checking into the battery charging state, or a software for ringing a special ringer sound (calling sound) in case of a telephone call, as stored in the ROM 12. The CPU 13 also outputs a command for flickering the mail LED 51, data LED 52 and the charge LED 53 of the telephone apparatus 3, in order to indicate for the telephone apparatus 3 the status of the information processing apparatus 2 displayed on the LCD 11, that is the information concerning the presence or absence of the newly received electronic mail or un-read electronic mail, the information indicating that the data communication is going on, or the information indicating the battery charging state. Thus the CPI 21 has the function of a half duplex synchronous communication and outputs various commands supplied from the system controller 30 to the telephone apparatus 3 over a serial bus 5a having clock and data lines in the serial cable 5. The CPU 13 also outputs disconnect commands for disconnecting the telephone apparatus 3 from the telephone network 4 during data communication and a ringer-off command for preventing the ringer sound from being produced in the telephone apparatus 3.

Figure 3:
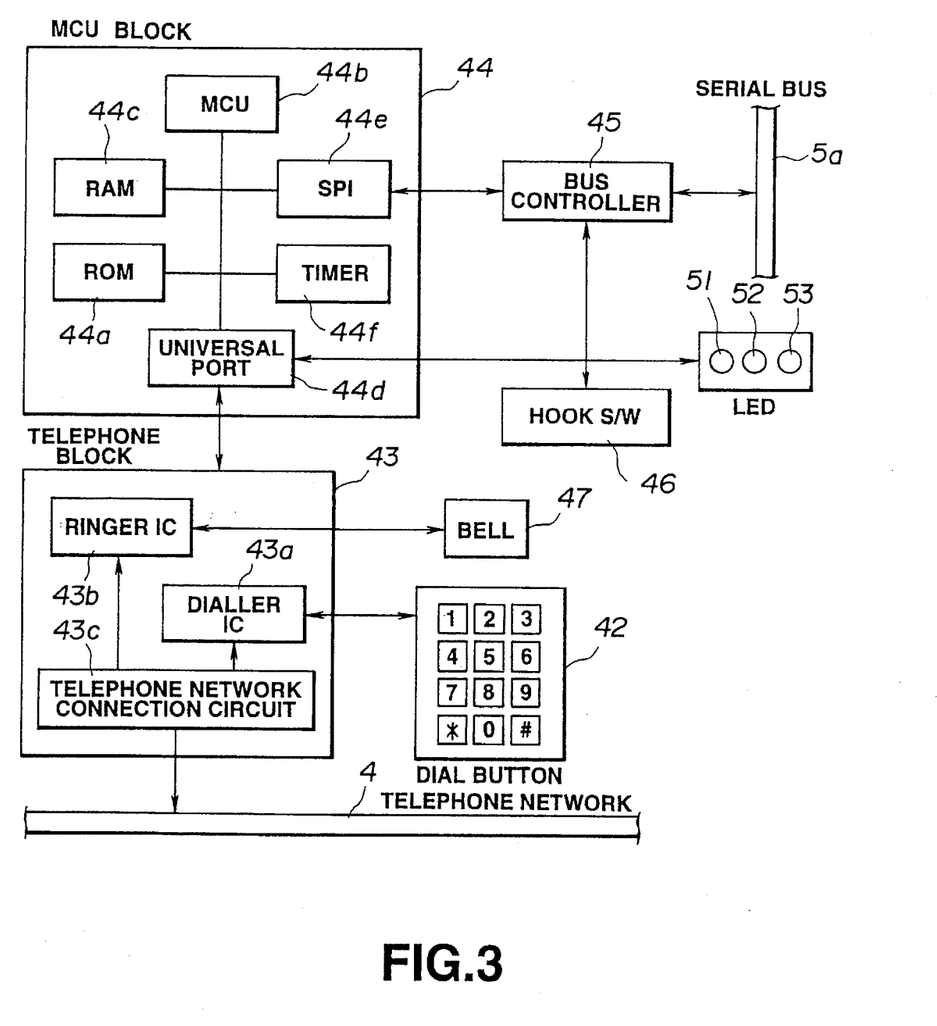
FIG.3 is a block diagram showing a specific arrangement of a telephone apparatus according to the present invention.

The telephone apparatus 3 according to the present invention is now explained. Referring to FIG.3, the telephone apparatus 3 includes the dial button 42, made up of, for example, 12 key switches, a telephone block 43 for converting the matrix information from the dial button 42 into the dial information for dialling, and a MCU block 44, as a one-chip micro-computer, for controlling the telephone block 43 based on various commands from the information processing apparatus 2. The telephone apparatus also includes a bus controller 45 for controlling data flow on the serial bus 5a, a hook switch 46 for detecting that the handset 41 is raised, a bell 47 for ringing a ringer sound, the mail LED 51, the data LED 52 and the charge LED 53.

Still referring to FIG.3, the telephone block 43 includes a dialer IC 43a for outputting tone signals or dial pulse signals based upon the matrix information from the dial button 42, a ringer IC 43b for detecting the singer signal on the telephone network 4 for ringing the bell 47, and a telephone network connecting circuit 43c having the function of disconnecting the telephone block 43 from the telephone network 4.

Still referring to FIG.3, the MCU block 44 includes a ROM 44a in which the control programs are previously stored, a MCU 44b for executing the control programs stored in the ROM 44a, and a RAM 44c for executing the control program stored in the ROM 44a. The MCU block also includes a universal port 44d for controlling the bus controller 45, hook switch 46, bell 47, the mail LED 51, the data LED 52 and the charge LED 53, an SPI 44e for receiving various commands transmitted from the information processing apparatus 2 and a timer 44f for measuring the time.

When the user lifts the handset 41, the hook switch 46 detects the off-hook state via the universal port 44d, and controls the telephone network connect circuit 43c so that the telephone apparatus 3 is connected to the telephone network 4, that is, so that the dialer IC 43a and the ringer IC 43b are connected to the telephone network 41.

If the user thrusts the dial button 42, the dialer IC 43a converts the matrix information from the dial button 42 into dial signals, such as dial pulse signals or so-called MF signals, and transmits the resulting signals over the telephone network connect circuit 43c to the telephone network 4. When the channel is established, the user may have a conversation with the called party using the handset 41.

In addition to having the above-mentioned functions of the telephone handset, the telephone apparatus 3 flickers the LEDs 51 to 53 and controls the ringer IC 43b and the telephone network connect circuit 43c by various commands supplied from the information processing apparatus 2.

Specifically, the MCU 44b controls the bus controller 45 via the universal port 44d in order to control data flow on the serial bus 5a. The SPI 44e has the function of serial half duplex synchronous communication and receives various commands supplied from the information processing apparatus 2 to transmit the received commands to the MCU 44b.

On reception of the mail LED lighting command, the MCU 44b lights the mail LED 51 over the universal port 44d. On reception of the data LED lighting command or the charge LED green or charge LED red lighting command, the MCU 44b lifts the data LED 52 or lights the charge LED 53 in green or in red. That is, the charge LED 53 has a green LED and a red LED. On reception of the disconnect command or the ringer-off command, the MCU 44b controls the telephone network connect circuit 43c or the ringer IC 43b, respectively, for disconnecting the ringer IC 43b from the telephone network 4 or for preventing the ringer sound from being issued by the bell 47. The MCU 44b periodically causes an interrupt in the information processing apparatus 2 via the SPI 44e in order to request transmission of various commands to the information processing apparatus 2.

The operation on execution of the telephone apparatus initializing software or the electronic mail software by the information processing apparatus 2 is now explained.

This software is executed when the power source switch is turned on, when the information processing apparatus 2 is connected to the telephone apparatus 3 or when the connection of the telephone apparatus 3 is detected under the on-state of the power source. The CPU 13 then issues various commands to the telephone apparatus 3.

Figure 4:
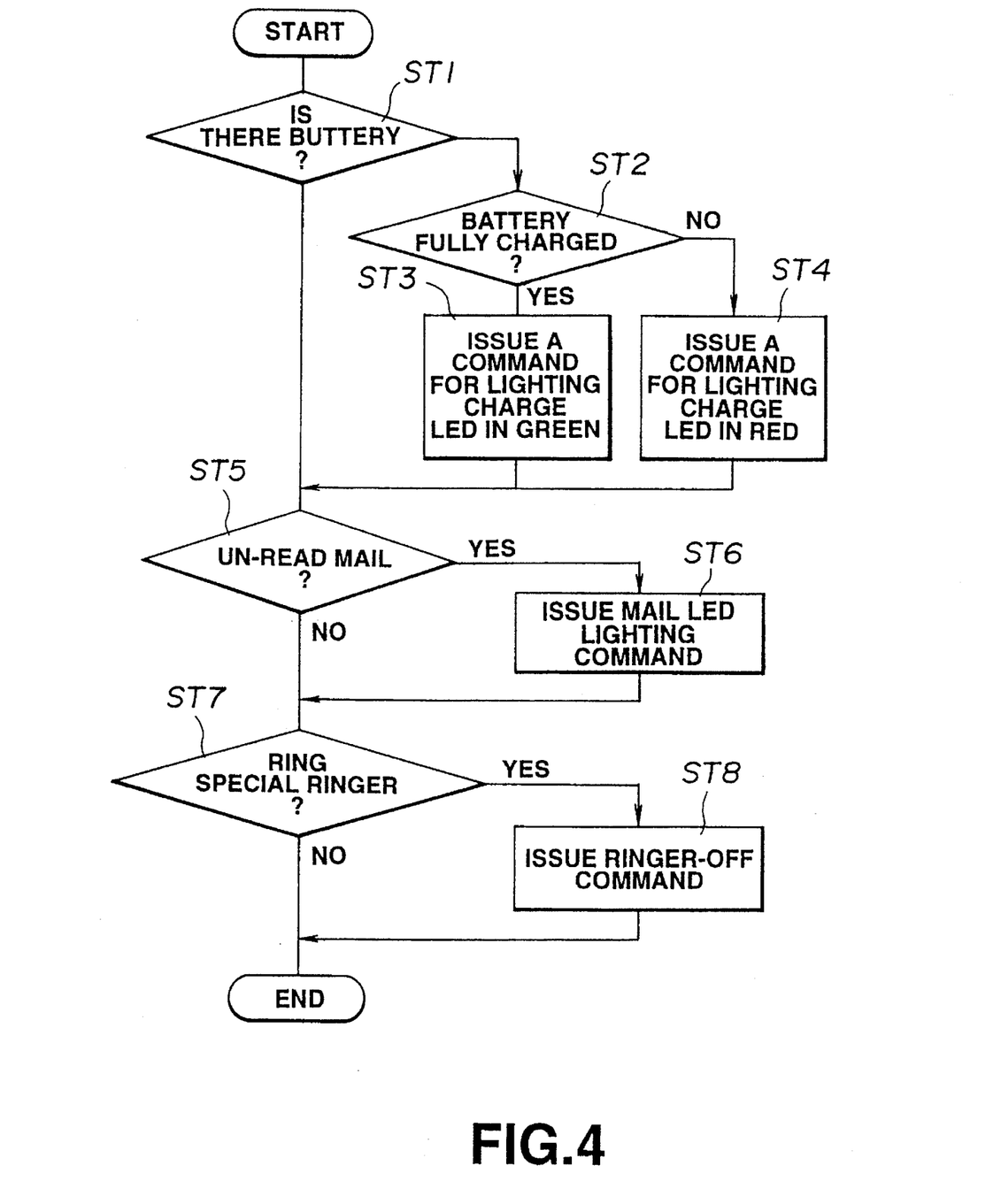
FIG.4 is a flow chart for illustrating the operation on running a telephone apparatus initializing software on the information processing apparatus shown in FIG.2.

Referring to FIG.4, the CPU 13 detects at a step ST1 whether or not there is enclosed a battery 32. If the result is YES, processing proceeds to a step ST2 and otherwise to a step ST5.

At the step ST2, the CPU 13 reads the voltage of the battery 32 and checks the charged state of the battery 32 based upon the battery voltage. If the battery 32 is charged fully, processing transfers to a step ST3 and otherwise to a step ST4. That is, the power source circuit 33 converts the voltage supplied by the AC adapter 31 to the battery 32 into voltages as demanded by the information processing apparatus 2, such as +36 V, +5 V, +3 V, +3.3 V or 3 V, while charging the battery 32 and detecting the voltage of the battery 32. The CPU 13 checks the charged state of the battery 32 based upon the voltage detected by the power source circuit 33.

At the step ST3, the CPU 13 transmits a charge LED green lighting command, indicating a fully charged stat, to the telephone apparatus 3, before proceeding to the step ST5. At the step ST5, the CPU 13 checks whether or not there is any unread electronic mail. If there is any unread electronic mail, the CPU 213 proceeds to a step ST6 and otherwise to a step ST7.

At the step ST6, the CPU 13 transmits a mail LED lighting command to the telephone apparatus 3, before proceeding to the step ST7.

At the step ST7, the user checks, using the key switch 20, whether or not the mode of ringing a special ringer has been set. If such mode is set, the CPU proceeds to a step ST8 and otherwise the program comes to a close.

At the step ST8, the CPU 13 transmits a ringer off command to the telephone apparatus 3, before the program comes to a close.

The operation of the information processing apparatus 2 on execution of the electronic mail software is now explained. The CPU 13 executes the electronic mail software and, for transmitting the electronic mail, reads out data, such as a telegram message (file), stored in the RAM 14, and transmits the data to the SCI 24. The SCI 24 has the function of asynchronous serial communication and transmits data read out from the RAM 14 as serial data to the modem unit 23, while transmitting a command controlling the modem unit 23. The modem unit 23 modulates serial data in a pre-set manner and outputs the modulated data over the telephone network 4. On reception of an electronic mail, the CPU 13 stores data produced on demodulation with the modem unit 23 in the RAM 14, while displaying the telegram message of the electronic mail on the LCD 11.

Figure 5:
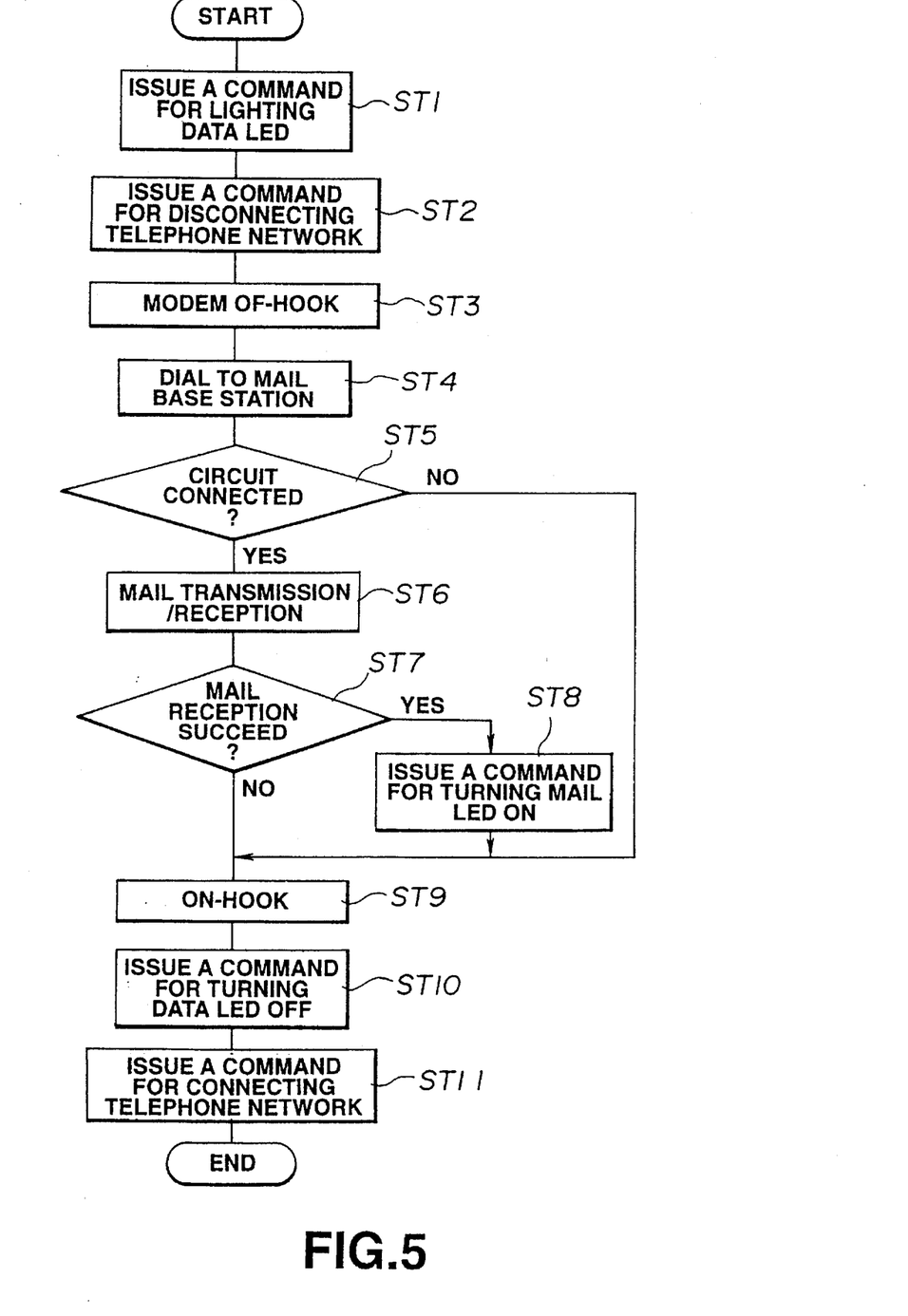
FIG.5 is a flow chart for illustrating the operation on running an electronic mail software on the information processing apparatus shown in FIG.2.

In order to prevent such situation in which the user inadvertently telephones during transmission and reception of the electronic mail as described above, so that the data communication results in failure, the information processing apparatus 2 transmits the information indicating that the transmission and reception of the electronic mail is going on to the telephone apparatus 3 over the SPI 21 and the serial cable 5 in accordance with the flow chart shown in FIG.5. This software is executed when the user has selected writing an electronic mail and routes it to a remote party, or when the user checks, either automatically or on his or her option, whether or not any mail addressed to the user has arrived.

At a step ST1 in FIG.5, the CPU 13 routes a data LED light command, indicating that data communication is proceeding, to the telephone apparatus 3, before proceeding to a step ST2.

At the step ST2, the CPU 13 routes to the telephone apparatus 3 a data LED light command of disconnecting the telephone apparatus 3 from the telephone network 4, before proceeding to a step ST3.

At the step ST3, the CPU 13 controls the modem unit 23 to an off-hook state, before proceeding to a step ST4.

At the step ST4, the CPU 13 dials the telephone number of a base station of the electronic mail, before proceeding to a step ST5.

At the step ST5, the CPU 13 detects whether or not the network to the base station has been set. If the result is YES, the CPU proceeds to a step ST6 and otherwise to a step ST9.

At the step ST6, the CPU 13 transmits or receives the electronic mail, before proceeding to a step ST7.

At the step ST7, the CPU 13 determines whether or not the electronic mail has been received. If the result is YES, the CPU proceeds to a step ST8 and otherwise to the step ST9.

At the step ST8, the CPU 13 transmits the mail LED light command to the telephone apparatus 3, before proceeding to the step ST9.

At the step ST9, the CPU 13 controls the modem unit 23 to an on-hook state, before proceeding to a step ST10.

At the step ST10, the CPU 13 transmits the data LED turn-off command of terminating the data communication and turning off the data LED 2 to the telephone apparatus 3, before proceeding to a step ST11.

At the step ST11, the CPU 13 transmits a connect command of connecting the telephone apparatus 3 to the telephone network 4 to the telephone apparatus 3 to terminate the operation of transmitting or receiving the electronic mail.

Figure 6:
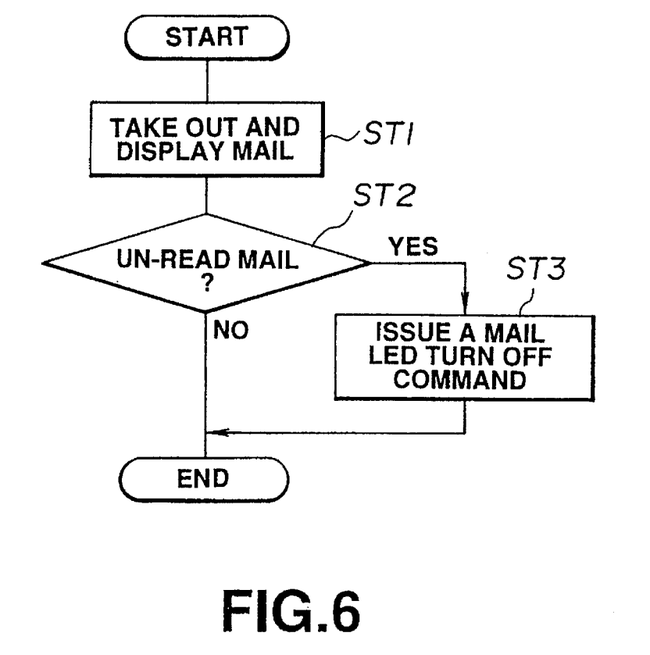
FIG.6 is a flow chart for illustrating the operation on running a mail display software on the information processing apparatus shown in FIG.2.

On the other hand, if the user is aware that an electronic mail has been received, and proceeds to read the electronic mail, the CPU 13 starts the mail display software of displaying an unread electronic mail, as shown in FIG.6.

At a step ST1 in FIG.6, the CPU 13 reads out an electronic mail file from the RAM 14 to display the mails on the LCD 11. When the user has read the mails and performs a corresponding operation, the CPU 13 proceeds to a step ST2.

At the step ST2, the CPU 13 checks whether or not there is any unread electronic mail. If there is no unread mail, the CPU proceeds to a step ST3 and, if otherwise, the program comes to a close.

The operation of the information processing apparatus 2 on execution of the software for checking the charged state of the battery 32 is now explained. In the turn-off state of the power source, that is in the sleep mode, the CPU 13 transmits the charged state of the battery 32 to the telephone apparatus 3, based on the voltage a detected by the power source circuit 33, in synchronism with a timer interrupt periodically generated by the RTC 16, as shown in a flow chart of FIG. 7.

Figure 7:
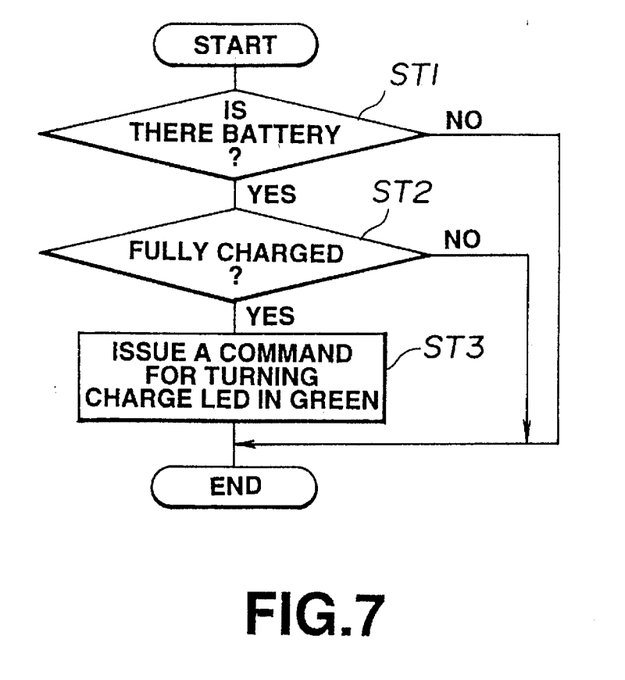
FIG.7 is a flow chart for illustrating the operation on running a battery charging state check software on the information processing apparatus shown in FIG.2.

At a step ST1 in FIG. 7, the CPU 13 detects whether there is any enclosed battery 32. If the result is YES, the CPU proceeds to a step ST2 and, if otherwise, the program comes to a close.

At the step ST2, the CPU 13 reads the voltage of the battery 32 from the power source circuit 33 and, based on the voltage thus read, decides whether the battery is fully charged. If the result of decision is YES, the CPU proceeds to a step ST3 and, if otherwise, the program comes to a close.

At the step ST3, the CPU transmits a charge LED green light command, indicating that the battery is charged fully, to the telephone apparatus 3. The program now comes to a close. Thus the charged state of the battery 32 may be confirmed without it being necessary for the user to turn on the power switch of the information processing apparatus 2.

Figure 8:
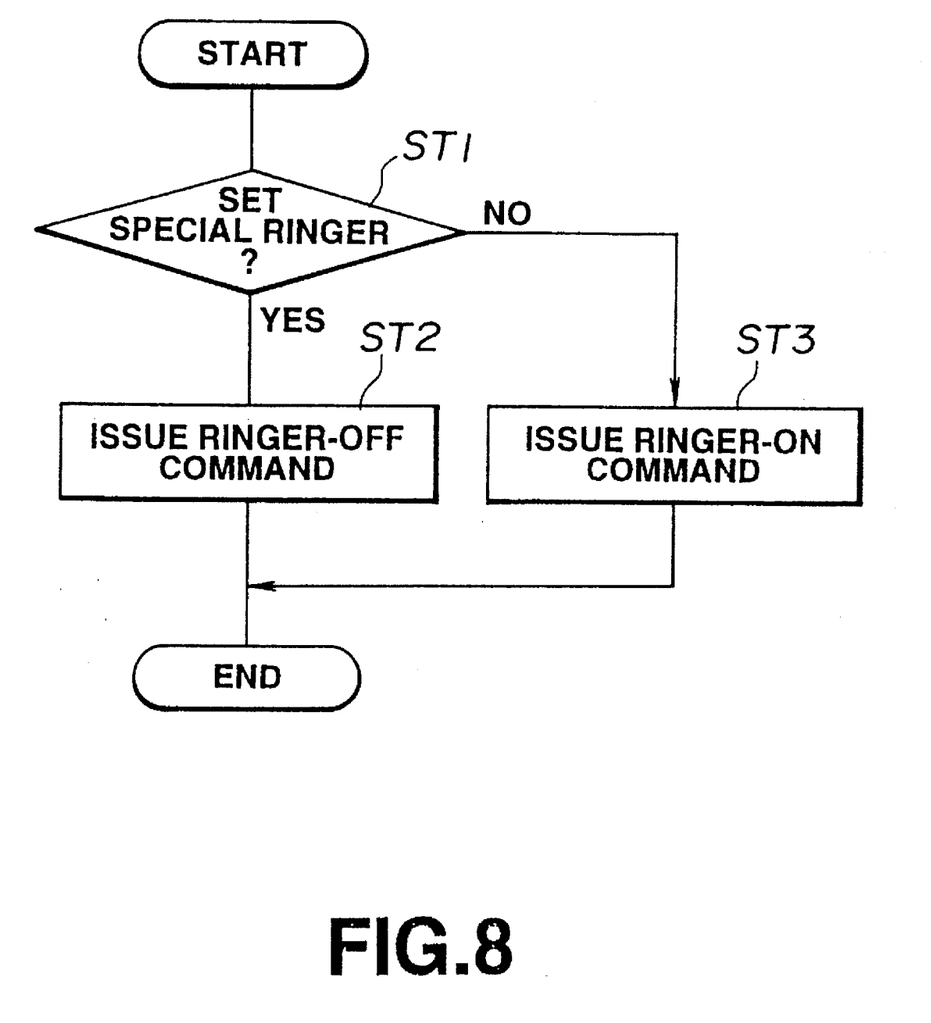
FIG.8 is a flow chart for illustrating the operation on running a ringer-sound ringing software on the information processing apparatus shown in FIG.2.

The operation of the information processing apparatus 2 on execution of the software for ringing a special ringer sound in case of a telephone call from outside is now explained. The software is executed when the user sets whether or not the special ringer sound be rung by the information processing apparatus 2.

At a step ST1 in FIG.8, the CPU 13 decides whether or not the information processing apparatus 2 has been set by the user to ring the ringer sound. If the result of decision is YES, the CPU 13 proceeds to a step ST2 and otherwise to a step ST3.

At the step ST2, the CPU 13 transmits a ringer-off command, indicating that the ringer sound be not rung at the telephone apparatus 3. The program then comes to a close. When a ringer signal is detected by the modem unit 23, a special ringer sound is issued from the speaker 26.

At the step ST3, the CPU transmits a ringer-on command, indicating that the ringer sound be rung by the telephone apparatus 3, to the telephone apparatus 3. The program then comes to a close.

The format of the various commands issued from the information processing apparatus 2 to the telephone apparatus 3 is briefly explained. Each command is made up of two bytes, of which the upper byte, referred to as a kind byte, indicates the kind of the device to be controlled, and the lower byte, referred to as a contents byte, indicates the control contents.

If the kind byte has a code indicating "M", the command is a mail LED command, with the contents bytes "1" and "0" indicating that the mail LED 51 is turned on and off, respectively.

If the kind byte has a code indicating "C", the command is a charge LED command, with the contents bytes "1", "2" and "0" indicating that the mail LED 51 is turned on in green, turned on in red and turned off, respectively.

If the kind byte has a code indicating "L", the command is a connect command to the telephone network 4 of the telephone apparatus 3, with the contents bytes "1" and "0" indicating that the telephone apparatus 3 is to be connected to the telephone network 4 and that such connection be interrupted, respectively.

If the kind byte has a code indicating "R", the command is a ringer command, with the contents bytes "1" and "0" indicating that the ringer sound be and be not rung, respectively.

Figure 9:
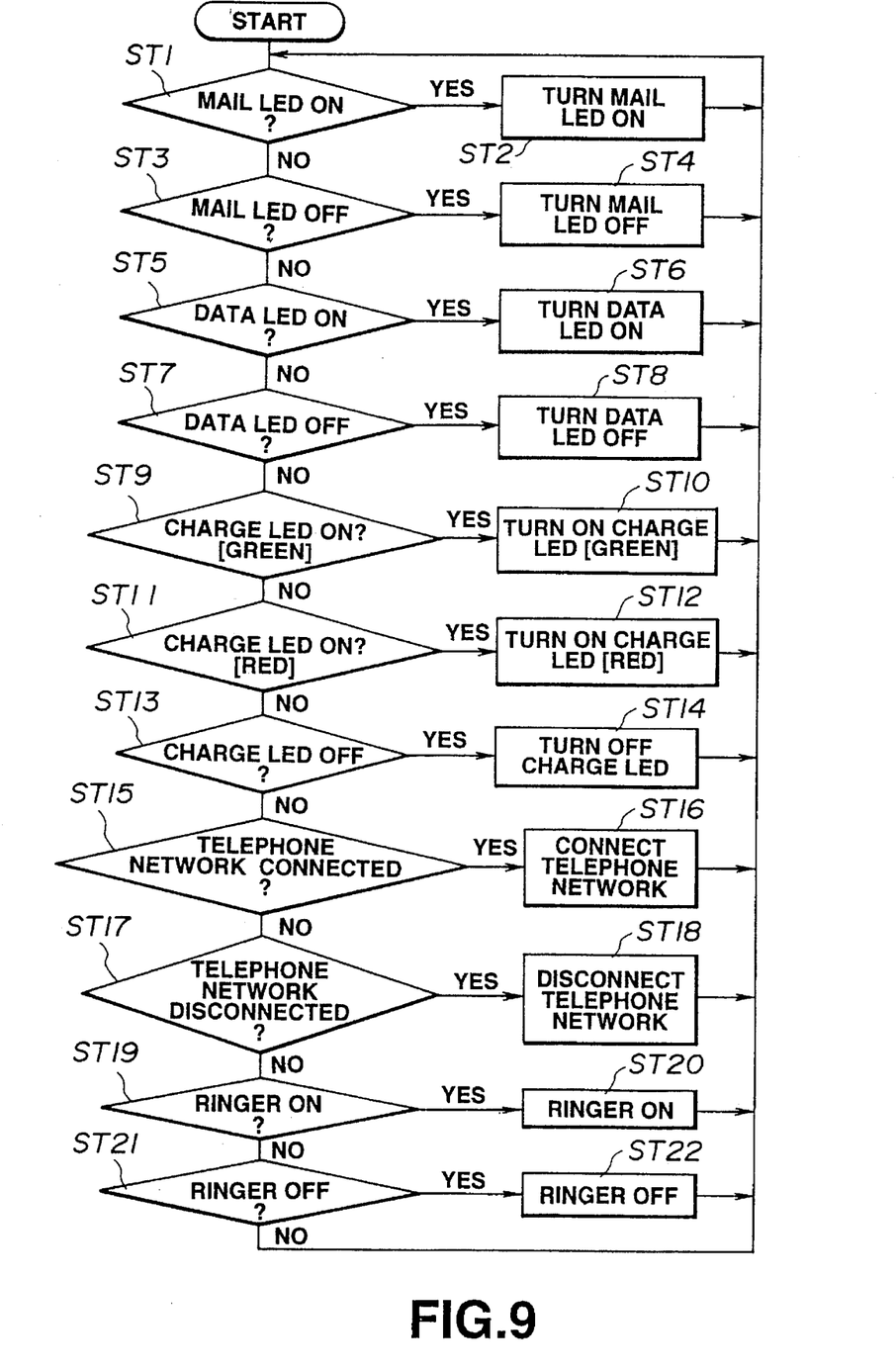
FIG.9 is a flow chart for illustrating the operation of the telephone apparatus shown in FIG.3.

The operation of the telephone apparatus 3, associated with the above-described operation of the information processing apparatus 2, is explained with reference to the flow chart of FIG.9.

The MCU 44b of the telephone apparatus 3 perpetually monitors data received by the SPI 44e. At a step ST1, the MCU 44b decides whether or not the mail LED light command has been received. If the result is YES, the MCU 44b proceeds to a step ST2 and otherwise to a step ST3.

At the step ST2, the MCU 44b turns on the mail LED 51, and reverts to the step ST1. As a result, the user is apprised, by corresponding display on the telephone apparatus 3, that there is an unread electronic mail, by connecting the information processing apparatus 2 to the telephone apparatus 3, without it being necessary for the user to turn on the power source of the information processing apparatus 2 or to start the electronic mail software.

At the step ST3, the MCU 44b decides whether or not the mail LED turn-off command has been received. If the result of decision is YES, the MCU 44b proceeds to a step ST4 and otherwise to a step ST5.

At the step ST4, the MCU 44b turns off the mail LED 51 and reverts to the step ST1. As a result, the user is apprised, by corresponding display on the telephone apparatus 3, that there is no unread electronic mail, by connecting the information processing apparatus 2 to the telephone apparatus 3, without it being necessary for the user to turn on the power source switch of the information processing apparatus 2 or to start the electronic mail software.

At the step ST5, the MCU 44b decides whether or not the data LED light command has been received. If the result of decision is YES, the MCU 44b proceeds to a step ST6 and otherwise to a step ST7.

At the step ST6, the MCU 44b turns on the data LED 52 and reverts to the step ST1. As a result, the user is apprised, from the corresponding display by the telephone apparatus 3, that data communication is proceeding at the information processing apparatus 2.

At the step ST7, the MCU 44b decides whether or not the data LED turn-off command has been received. If the result of decision is YES, the MCU 44b proceeds to a step ST8 and otherwise to a step ST9.

At the step ST8, the MCU 44b turns off the data LED 52 and reverts to the step ST1. As a result, the user is apprised, from the corresponding display by the telephone apparatus 3, that data communication is not proceeding at the information processing apparatus 2.

At the step ST9, the MCU 44b decides whether or not the charge LED green light command has been received. If the result of decision is YES, the MCU 44b proceeds to a step ST10 and otherwise to a step ST11.

At the step ST10, the MCU 44b turns on the charge LED 53 in green, and reverts to the step ST1. As a result, the user is apprised by the interrupt by the RTC 16 at the information processing apparatus 2 that the battery 32 of the information processing apparatus 2 has been fully charged, from the corresponding display at the telephone apparatus 3, without the necessity of turning on the power source switch of the information processing apparatus 2.

At the step ST11, the MCU 44b decides whether or not the charge LED red turn-on command has been received. If the result of decision is YES, the MCU 44b proceeds to a step ST12 and otherwise to a step ST13.

At the step ST13, the MCU 44b decides whether or not the charge LED turn-off command has been received. If the result of decision is YES, the MCU 44b proceeds to a step ST14 and otherwise to a step ST15.

At the step ST14, the MCU 44b turns off the charge LED 53 and reverts to the step ST1.

At the step ST15, the MCU 44b decides whether or not the connect command has been received. If the result of decision is YES, the MCU 44b proceeds to a step ST16 and otherwise to a step ST17.

At the step ST16, the MCU 44b connects the telephone apparatus 3 to the telephone network 4 and reverts to the step ST1.

At the step ST17, the MCU 44b decides whether or not the disconnect command has been received. If the result of decision is YES, the MCU 44b proceeds to a step ST18 and otherwise to a step ST19.

At the step ST18, the MCU 44b disconnects the telephone apparatus 3 from the telephone network 4 and reverts to the step ST1. As a result, the data communication is allowed to proceed as normally even if the user telephones through a mistake during the data communication.

At the step ST19, the MCU 44b decides whether or not the ringer-on command has been received. If the result of decision is YES, the MCU 44b proceeds to a step ST20 and otherwise to a step ST21.

At the step ST20, the MCU 44*b* controls the ringer IC 43*b* so that the bell 47 is rung when the ringer signal is detected by the ringer IC 43*b*, and reverts to the step ST1.

At the step ST21, the MCU 44*b* decides whether or not the ringer-off command has been received. If the result of decision is YES, the MCU 44*b* proceeds to a step ST22 and, if otherwise, reverts to the step ST1.

At the step ST22, the MCU 44*b* controls the ringer IC 43*b* so that the bell 47 is not rung, and reverts to the step ST1. As a result, if the user sets the information processing apparatus 2 so that the ringer sound is produced, the ringer sound of the telephone apparatus 3 may be prevented from being produced, so that noisy ringing of both the ringer sounds may be prevented from occurrence.

Figure 10:
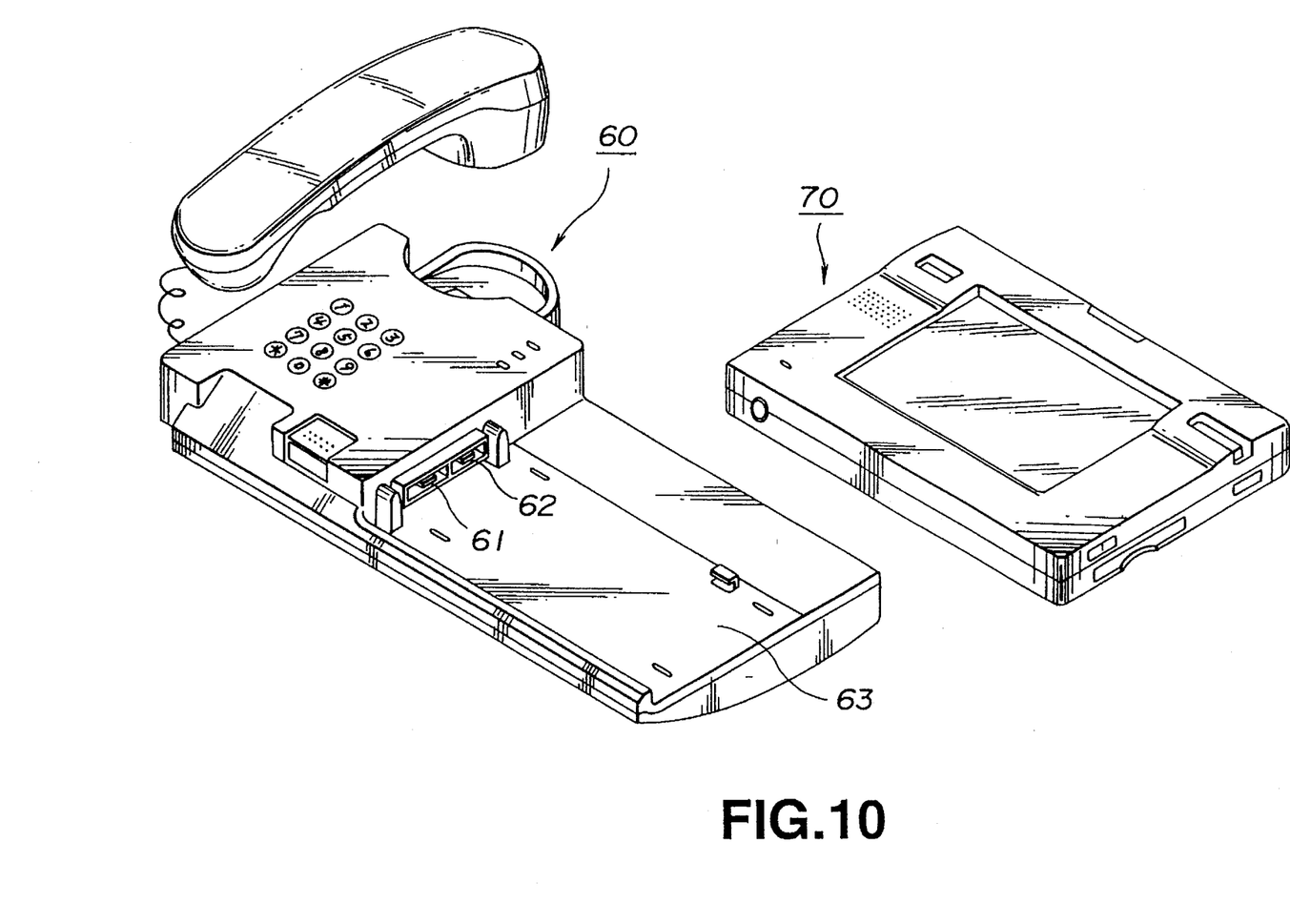
FIG.10 is a perspective view showing an example of concrete connection of the telephone apparatus and the information processing apparatus according to the present invention.

In the above-described embodiment, the information processing apparatus 2 and the telephone apparatus 3 are interconnected over the serial cable 5. However, such serial cable 5 may be eliminated if a so-called plug-in structure is employed in which connectors 61, 62 for connection and a setting portion 63 for setting an information processing apparatus 70 are provided in a telephone apparatus 60, and a connector, not shown, is provided in the information processing apparatus 70 facing the connectors 61, 62, as shown in FIG. 10.

The present invention is not limited to the above-described embodiments. For example, the asynchronous communication system may be employed in place of the synchronous communication system as a communication system for communication between the information processing apparatus 2 and the telephone apparatus 3. For means for inputting the information, such as characters, a keyboard may also be employed in place of the touch-screen 17, while a CRT display or the like may be employed as display means in place of the LCD 11.

What is claimed is:

1. An information communication terminal operable by a single operator for communicating between other information communication terminals or other communication devices by way of a telephone network, said terminal comprising:

informational processing means for performing data communication by way of said telephone network, said informational processing means having a first display device for displaying information thereon and means for generating status signals and command signals including a disconnect command signal when said informational processing means is performing data communication and for transmitting said status and command signals therefrom; and telephone means for communicating between operators by way of said telephone network, said telephone means having a second display device, means for receiving said status signals and for providing a display on said second display device corresponding to the received status signals so as to provide an indication of the status to the operator of said telephone device, and means responsive to said disconnect command signal for disconnecting said telephone means from said telephone network when said informational processing means is performing data communication by way of said telephone network.

2. An information communication terminal according to claim 1, wherein said first display device is a liquid crystal display and wherein said second display device includes at least one light emitting diode.

3. An information communication terminal operable by a single operator for communicating between other information communication terminals or other communication devices by way of a telephone network, said terminal comprising:

informational processing means for performing data communication by way of said telephone network, said informational processing means having a battery and means for generating an informational signal representing a charged state of said battery and for transmitting said informational signal therefrom; and telephone means for communicating between operators by way of said telephone network, said telephone means having a display device and means for receiving said informational signal and for providing a display on said display device corresponding thereto so as to provide an indication of the charged state of said battery to the operator of said telephone means.

4. An information communication terminal according to claim 3, wherein said informational processing means includes a second display device for displaying information thereon.

5. An information communication terminal according to claim 4, wherein said display device of said telephone means is a liquid crystal display and wherein said second display device includes at least one light emitting diode.

6. An information communication terminal operable by a single operator for communicating between other information communication terminals or other communication devices by way of a telephone network, said terminal comprising:

informational processing means for performing data communication by way of said telephone network, said informational processing means operable in a relatively low power mode and a relatively high power mode and including a first display device, a battery and means operable in said relatively low power mode for generating an informational signal representing a charged state of said battery and for transmitting said informational signal therefrom; and telephone means for communicating between operators by way of said telephone network, said telephone means having a second display device and means for receiving said informational signal and for providing a display on said second display device corresponding thereto so as to provide an indication of the charged state of said battery to the operator of said telephone means without having to activate said relatively high power mode of said informational processing means.

7. An information communication terminal according to claim 6, wherein said first display device is a liquid crystal display and wherein said second display device includes at least one light emitting diode.

8. An information communication terminal operable by a single operator for communicating between other information communication terminals or other communication devices by way of a telephone network, said terminal comprising:

informational processing means for performing data communication which includes receiving electronic mail by way of said telephone network, said informational processing means having a first display device for displaying thereon information corresponding to the electronic mail and means for generating an informational signal representing the receipt of said electronic mail and for transmitting said informational signal therefrom; and telephone means for communicating between operators by way of said telephone network, said telephone means having a second display device and means for receiving said informational signal and for providing a display on said second display device corresponding thereto so as to provide an indication of the received electronic mail to the operator of said telephone means.

9. An information communication terminal according to claim 8, wherein said display device of said telephone means is a liquid crystal display and wherein said second display device includes at least one light emitting diode.

10. An information communication terminal operable by a single operator for communicating between other information communication terminals or other communication devices by way of a telephone network, said terminal comprising:

informational processing means for performing data communication which includes receiving electronic mail by way of said telephone network, said informational processing means operable in a relatively low power mode and a relatively high power mode and including a first display device for displaying thereon information corresponding to the electronic mail and means for generating an informational signal representing the receipt of said electronic mail and for transmitting said informational signal therefrom; and telephone means for communicating between operators by way of said telephone network, said telephone means having a second display device and means for receiving said informational signal and for providing a display on said second display device corresponding to the received informational signal when said informational processing means is in said relatively low power mode so as to provide an indication of the received electronic mail to the operator of said telephone means without having to activate said relatively high power mode of said informational processing means.

11. An information communication terminal according to claim 10, wherein said first display device is a liquid crystal display and wherein said second display device includes at least one light emitting diode.

12. An information communication terminal comprising:

informational processing means for executing a number of predetermined application programs and for performing data communication which includes receiving electronic mail by way of a telephone network, said informational processing means operable in a relatively low power mode and a relatively high power mode and including a battery, means operable in said relatively low power mode for generating a battery informational signal representing a charged state of said battery and for transmitting said battery informational signal therefrom, a first display device for displaying thereon results of the execution of an application program and information corresponding to the electronic mail, means for generating an electronic mail informational signal representing the receipt of said electronic mail and for transmitting said electronic mail informational signal therefrom, and means for generating a disconnect command signal when said informational processing means is performing data communication and for transmitting said disconnect command signal therefrom; and telephone means for communicating between operators by way of said telephone network, said telephone means having a second display device, means for receiving said battery and said electronic mail informational signals and for providing displays on said second display device corresponding thereto when said informational processing means is in said relatively low power mode so as to provide indications of the charged state of said battery and the received electronic mail to the operator of said telephone means without having to activate said relatively high power mode of said informational processing means, and means responsive to said disconnect command signal for disconnecting said telephone means from said telephone network when said informational processing means is performing data communication by way of said telephone network.

\* \* \* \* \*